Figure 1:
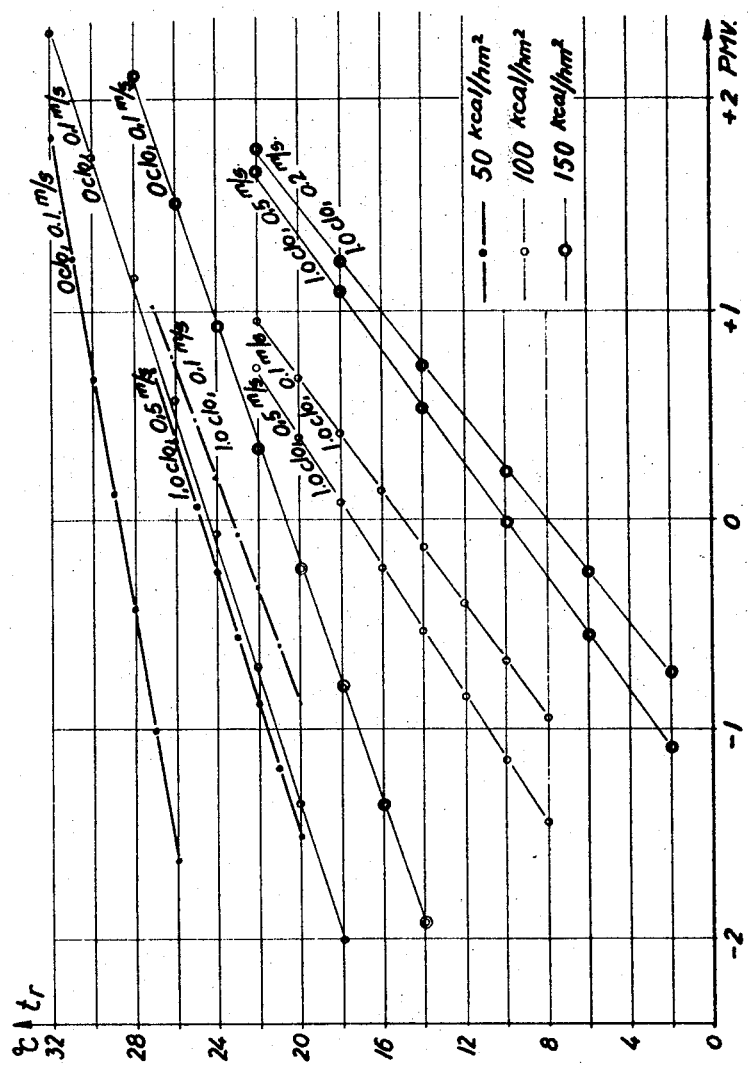

United States Patent [19]
Madsen

[11] 3,751,634
[45] Aug. 7, 1973

[54] APPARATUS FOR MEASURING THE DEGREE OF THERMAL DISCOMFORT AND A SYSTEM COMPRISING SUCH AN APPARATUS

[76] Inventor: Thomas Lund Madsen, No. 11 Rosengaardsvej, 2830 Virum, Denmark

[22] Filed: Nov. 15, 1971

[21] Appl. No.: 198,524

[52] U.S. Cl. .............................. 219/497, 219/501
[51] Int. Cl. ............................................. H05b 1/02
[58] Field of Search .................... 219/494, 497, 499, 219/501

[56] References Cited
UNITED STATES PATENTS

| | | | |
|---|---|---|---|
| 3,549,864 | 12/1970 | Borer | 219/497 |
| 3,553,429 | 1/1971 | Nelson | 219/497 |
| 3,634,652 | 1/1972 | Shimizu | 219/497 |

*Primary Examiner*—Bernard A. Gilheany
*Assistant Examiner*—F. E. Bell
*Attorney*—Richard K. Stevens, William A. Knoeller et al.

[57] ABSTRACT

An apparatus for measuring the degree of thermal discomfort by means of a measuring body for simulating the heat exchange of the human body with the environment. The temperature of the measuring body is maintained at a constant value near the temperature of the human body and the power supplied to the measuring body is measured. From this measured value a first comparison magnitude is derived, taking into consideration a fictitious total heat production and/or type of clothing set on the apparatus. A second comparison magnitude also depending on the fictitious heat production and/or type of clothing set on the apparatus, but not on the power supplied to the measuring body is also produced. The two comparison magnitudes are compared and the comparison result is the output magnitude of the apparatus which can be displayed or used in any other way.

14 Claims, 8 Drawing Figures

APPARATUS FOR MEASURING THE DEGREE OF THERMAL DISCOMFORT AND A SYSTEM COMPRISING SUCH AN APPARATUS

The present invention relates to an apparatus for measuring the degree of thermal discomfort comprising a heatable probe or measuring body for simulating the heat exchange of the human body with the environment, means for regulating the temperature of the measuring body, as well as means for measuring the heat exchange of the measuring body with the environment.

In a prior art apparatus of the type dealt with, the measuring body is constituted of a so-called "thermal dummy" which is constructed of interconnected, box-shaped and tubular elements in imitation of the human body. The walls of the elements have internally an aluminium plate heated by a heating element to a temperature which is maintained constant at 37° C corresponding to the internal body temperature while at rest. On the outside of the said aluminium plate, a plastic plate is fitted in imitation of the thermal resistance offered by the skin. On top of the plastic plate yet another aluminium plate is mounted. By means of thermoelements, the temperature on both sides of the plastic plate as well as on the outside of the outermost aluminium plate is measured. By means of the difference in temperature between the two sides of the plastic plate, the thermal resistance of which is known, it is possible to calculate the heat flow. The "thermal dummy" is divided into 37 measuring zones, which provides the possibility of obtaining detailed information about the thermal field on the spot where the dummy is placed. As a consequence of the great number of measurements derived from the thermal dummy, no immediate impression can be gained regarding the thermal conditions and the measuring values are, therefore, normally supplied to a data processing system for further processing.

It is an object of the present invention to provide an apparatus, by means of which it is possible, in an extremely simple manner and without the employment of a data processing system, to determine the degree of thermal discomfort at different adjustable values of the total internal heat production of the body, that is to say the activity level, and of the thermal resistance of the clothing. The activity level as well as the thermal resistance of the clothing is known for a great number of the activities that occur in practice and for the types of clothing commonly used.

In order to achieve the said object, the apparatus according to the invention, is characterized in that the means for measuring the heat exchange of the measuring body is constituted of means for measuring the power supplied to the measuring body and for producing a first comparison magnitude relating to this power, and in that the apparatus contains means for comparing the first comparison magnitude with a second comparison magnitude, which is dependent upon a frictitious total heat production and/or type of clothing to which the apparatus has been set. The invention is based on the recognition that, by means of an appropriate construction of the measuring body, it is possible, from a simple measurements of the power supplied to the measuring body and, thereby, of the power supplied by the measuring body to the environment, to determine the degree of thermal discomfort at different set values of the heat production and/or clothing, if the magnitude measured is corrected with a view to the said set values and if it is subsequently compared with a magnitude which is representative of the heat production and/or the type of clothing the apparatus is set to.

Figure 2:
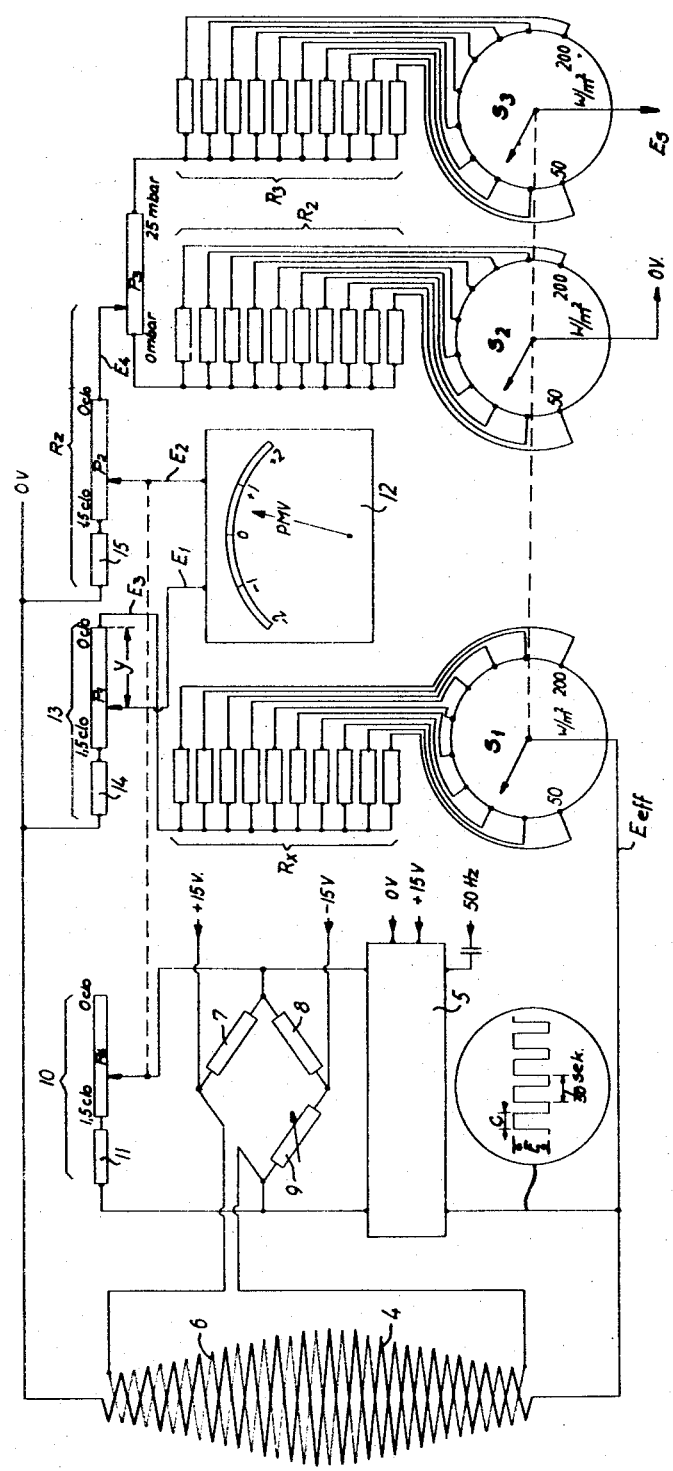
Figure 3:
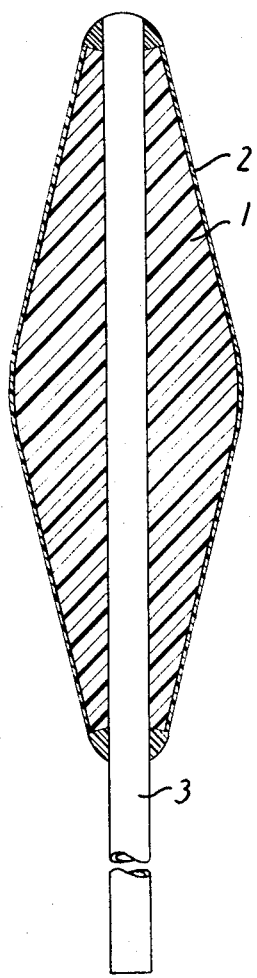
Figure 5:
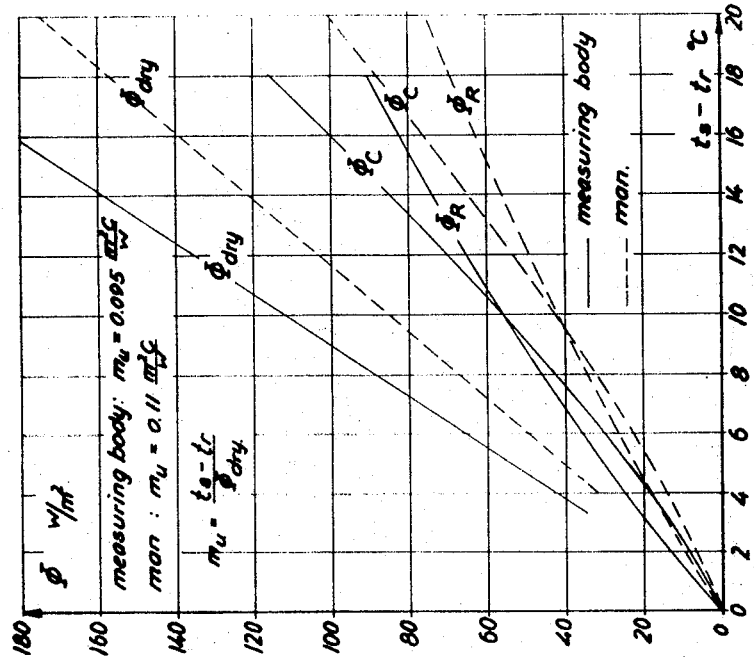
Figure 4:
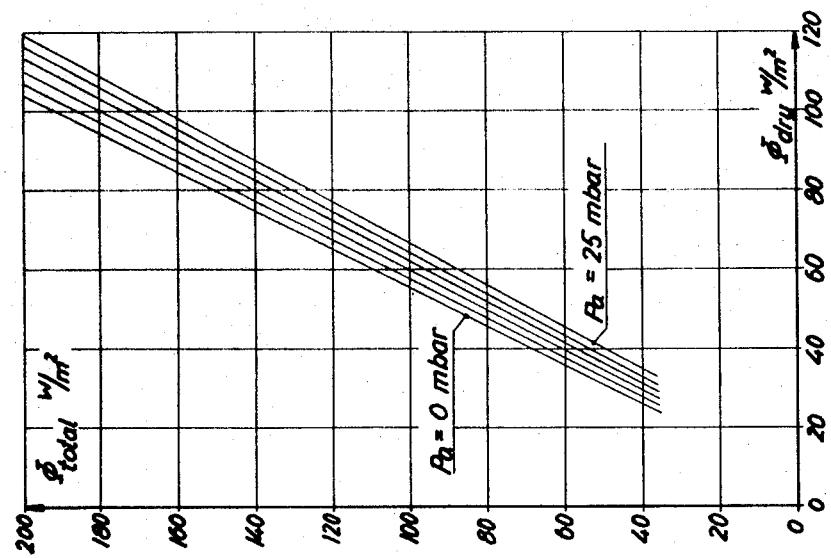
Figure 7:
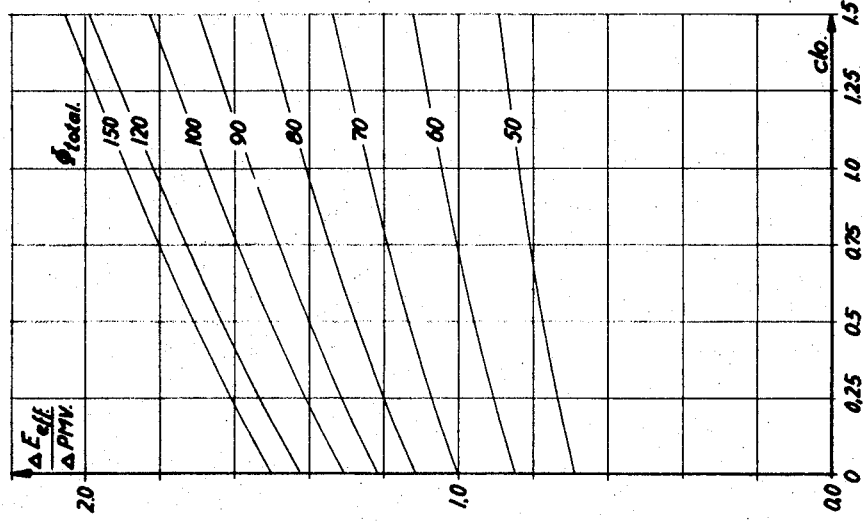
Figure 6:
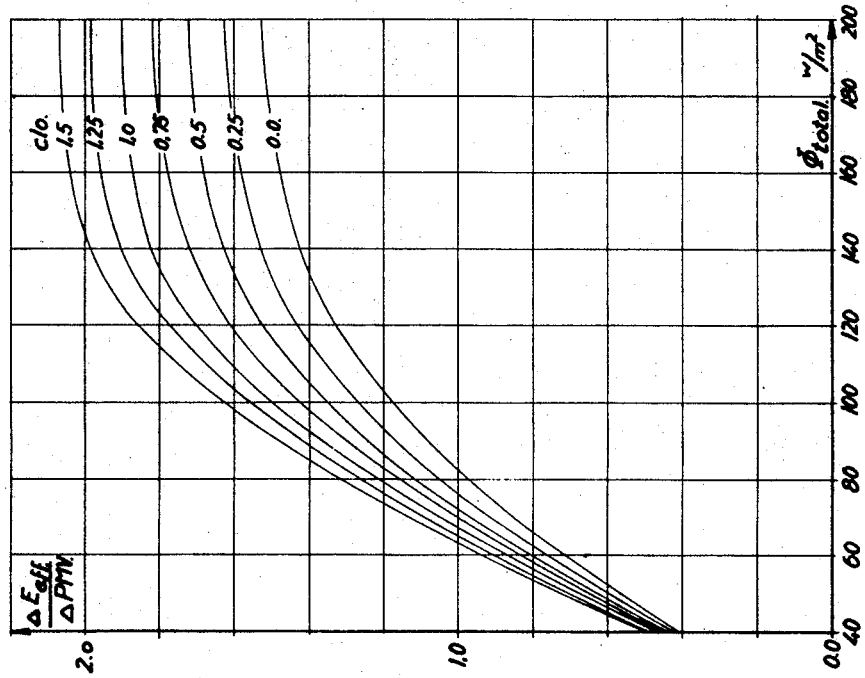
Figure 8:
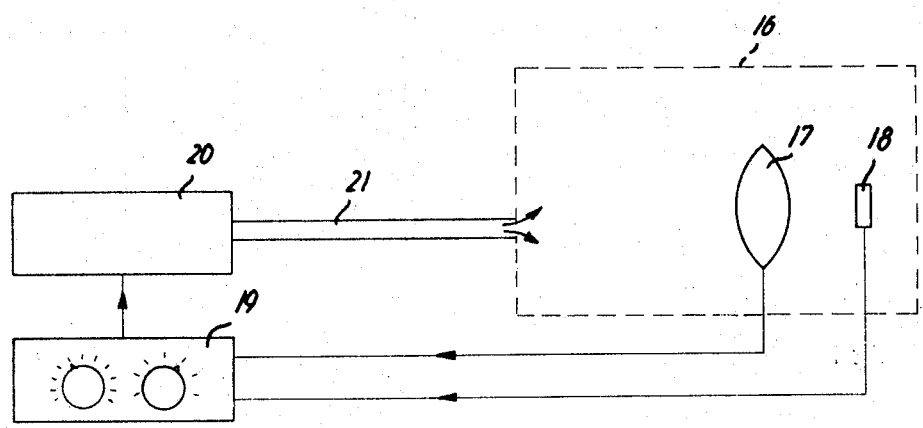

The invention is described in greater detail below with reference to the diagrammatical drawings, in which FIG. 1 shows curves demonstrating the relation between the PMV-value and the resulting temperature $t_r$ of the environment for different activity levels (kcal/hm$^2$), different types of clothing (clo) and different air velocities (m/s), FIG. 2 shows a diagram of an embodiment of the apparatus according to the invention, FIG. 3 shows, in section, a measuring body for use in the apparatus according to the invention, FIG. 4 shows curves demonstrating the relation between $\Phi_{total}$ (w/m$^2$) and $\Phi_{dry}$ (w/m$^2$) with the water vapor pressure $p_a$ (mbar) as parameter, FIG. 5 shows curves demonstrating the dry heat exchange ($\Phi_{dry}$) as well as the heat exchanges by convection ($\Phi_C$) and radiation ($\Phi_R$) as a function of the difference between the surface temperature ($t_s$) and the resulting temperature of the environment ($t_r$) for the measuring body as well as for a person, FIG. 6 shows curves that indicate the ratio $\Delta E_{eff}/\Delta PMV$ as a function of $\Phi_{total}$ (w/m$^2$) for different types of clothing (clo), FIG. 7 shows curves that demonstrate the relation between $\Delta E_{eff}/\Delta PMV$ and the clothing (clo) for different values of $\Phi_{total}$, and FIG. 8 shows a diagram representing a system equipped with an apparatus according to the invention.

The present invention is based upon the comfort equation formulated by P.O. Fanger, cf. P.O. Fanger "Thermal Comfort," Danish Technical Press, Copenhagen, 1970. According to the comfort equation essentially six factors determine the degree of discomfort felt by a person when carrying out a given form of activity in given circumstances and when wearing a specific type of clothing. These factors are:

The air temperature
The air velocity
The mean radiant temperature
The humidity of the air
The activity level (total internal heat production)
The clothing worn The influence of the clothing is based upon its thermal resistance. It is measured in clo (m$^2$C/W) and is known for a great variety of clothing commonly worn.

The activity level of a great number of activities taking place in actual practice is also known. It is usually measured in W/m$^2$.

The first four factors are determined by the thermal circumstances that prevail on the spot where the person in question happens to be staying. Each of the four factors can be measured by itself, subsequent to which it is possible, by means of the comfort equation, to calculate the degree of discomfort at desired values of the activity level and of the clothing.

However, it is laborious to have to measure these four factors and, in actual practice, it is rather difficult to carry out the measurements especially as far as the air velocity and the mean radiant temperature are concerned. For this reason, in the apparatus according to the invention, use is made of the measuring body which is described in greater detail below, which body perceives the ambient thermal conditions the same way in which a person does and thus renders it possible to obtain a single measuring value which is representative of, at any rate, three of the said four factors.

The degree of discomfort at a given activity level and with a specific item of clothing is, according to P.O. Fanger, defined as the difference between the internal heat production and the heat loss to the actual environment of a person who is assumed to be in a state of thermal comfort.

Different units may be employed when measuring thermal discomfort. One of these units is the predicted mean vote PMV. The scale goes from −3 to +3 and is correlated with a person's conception of the thermal conditions detailed below.

| | |
|---|---|
| −3 | cold |
| −2 | cool |
| −1 | slightly cool |
| 0 | neutral |
| +1 | slightly warm |
| +2 | warm |
| +3 | hot |

The other unit employed is the predicted percentage of dissatisfied PPD. "Dissatisfied," in this context, is taken to mean those persons whoe deem the thermal conditions to be −3, −2, +2 or +3. No linear relation exists between the two units.

In FIG. 1, the relation between the PMV-value and the resulting temperature of the environment at various activity levels, with various types of clothing and at various air velocities is indicated. It will be seen that a linear relation exists here and it is for this reason that the PMV-values are particularly suitable for the dimensioning of the components of an apparatus according to the invention.

As a basis for the construction of a measuring body for use in the apparatus described here, the heat exchange of a normal person with the environment is used. This heat exchange can, in principle, be divided into two parts, viz. the dry heat exchange $\Phi_{dry}$ and the wet heat exchange $\Phi_{wet}$, where $$\Phi_{dry} + \Phi_{wet} = \Phi_{total}.$$

The dry heat exchange consists of the heat exchange by radiation and the heat exchange by convection. The wet heat exchange consists of the heat loss by water vapor diffusion through the skin, the heat loss by the evaporation of perspiration and the heat loss by the heating and humidification of the inhaled air.

If the water vapor pressure $p_a$ of the ambient air is known and the air temperature is assumed to be 20° C, it is possible to calculate the wet heat exchange. The error committed by assuming the air temperature to be 20° C is negligible in a temperature range from 10°−30° C.

In FIG. 4, the total heat exchange $\Phi_{total}$ is drawn as a function of the dry heat exchange $\Phi_{dry}$ for various values of the water vapor pressure $p_a$. When $\Phi_{dry}$ and $p_a$ are known, $\Phi_{total}$ can be arrived at from the curves.

It is possible to determine $p_a$, for instance, by measuring the correlated values of the air temperatures and its relative humidity.

The heat exchange by radiation and the heat exchange by convection and, the collective dry heat exchange, can be determined by means of P.O. Fangers's comfort equation. FIG. 5 shows these magnitudes calculated for a nude person as well as for the measuring body. It will be seen that with a good degree of approximation a linear relation exists between the dry heat exchange $\Phi_{dry}$ and the difference between the surface temperature of the environment. The thermal resistance between the measuring body and the environment is shown to be $m_u = 0.095\ m^2C/V$ by the curves. The relation between the surface temperature ($t_s$) and the resulting temperature ($t_r$) of the environment thus is $$t_r = t_s - 0.095 \times \Phi_{dry}\ (\text{in } °C).$$

(I)

An embodiment of the measuring body employed in the apparatus according to the invention is shown in FIG. 3. From a geometrical point of view it consists, taken by and large, of two cones having a small apex angle and with the base surfaces facing each other, the tops of the cones being truncated and replaced by spherical segments. The shape shown does provide the measuring body with the same relation between the projection surfaces in the six main directions as for a normal person. It is possible, moreover, to allow the measuring body to assume various positions corresponding to those of a standing, sitting or reposing person. The size of the measuring body is chosen in such a way that it has the same ratio between the heat exchange by radiation $\Phi_R$ and the heat exchange by convection $\Phi_C$ as a person. This is possible owing to the fact that a person has a smaller radiation area than convection and because $\Phi_C/\Phi_R$ increases with a diminution of the diameter of the measuring body. The total height of the measuring body can, by way of example, be of the order of magnitude of 20 cm.

A body 1 of plastic foam is placed inside the measuring body, around which an electrical resistance wire (not shown) is wound. The outermost portion of the measuring body consists of an approximately 1 mm thick layer 2 of heat-insulating material. This layer, in conjunction with the regulation of the heating element, assures that the probe has the same ratio of $\Phi_{dry}$ to $t_s$ as a person who is in a state of comfort. The measuring body is mounted on a rod 3 which is supported in a frame, preferably in such a way that the measuring body can assume different positions.

With reference to page 39 of the aforementioned book by P.P. Fanger, it holds that $$t_s = 35.7 - 0.028 \times \Phi_{total}\ (\text{in } °C).$$

(II)

If the water vapor pressure is assumed to be 15 mbar, which, for example, corresponds to an air temperature of 24° C and a relative air humidity of 50%, then it is possible to deduce from FIG. 4 the following relation between the total heat exchange $\Phi_{total}$ and the dry heat exchange $\Phi_{dry}$:

$$\Phi_{total} = 1.96 \times \Phi_{dry} - 21.56\ (W/m^2).$$

(III)

By inserting (III) into (II), $$t_s = 36.4 - 0.054 \times \Phi_{dry}$$

(IV)

is obtained.

From a physical point of view, it is possible to realize this equation in the following three ways:

1. The heating element is maintained at 36.4° C, and a thermal resistance, i.e., layer 2 of FIG. 3, is used that equals 0.054 $m^{2°}$ C/W.
2. The temperature of the heating element is regulated with a load error (offset) of 0.054 $m^2$ °C/W. This will have the effect that the temperature of the heating element is at all times equal to $t_s$.
3. A combination of 1. and 2.

It is difficult to put 1. into effect, 2. yields an unrealistic surface as well as an unstable registration since layer 2 is lacking. On the other hand, 3. provides the possibility of selecting a suitable thermal resistance $m_s < 0.054$ $m^2$ °C/W for layer 2 and of allowing the remainder of $m_s$ to be incorporated as a load error.

FIG. 2 shows the regulation of the temperature of the measuring body, 4 designates the resistance wire already mentioned which is located in the measuring body. This resistane wire is supplied from an amplifier 5 which is adapted in such a way that pulses are supplied to the heating wire at a constant amplitude E and with a constant repetition frequency of, by example, 50 C/s. The power supplied to the measuring body is adjusted by regulation of the pulse width c. If the output voltage of the amplifier is measured with a moving coil instrument, its reading $E_{eff}$ will be proportional to the power supplied to the measuring body and, consequently, also proportional to the power supplied by the measuring body to the environment, that is to say $\Phi_{dry}$.

From (I) and (IV)

$t_r = 36.4 - 0.149 \times \Phi_{dry}$ (in ° C) or $t_r = 36.4 - 0.149 \times k \times E_{eff}$ (in ° C) are obtained, where k (W/$m^2$ ° C) is the ratio of $\Phi_{dry}$ to $E_{eff}$.

The temperature of the measuring body is measured by means of a resistance wire 6 possessing a suitable temperature coefficient and disposed underneath layer 2. It is possible to measure the temperature instead with one or several thermistors. The resistance of wire 6 and, thereby, its temperature, is measured by means of a measuring bridge containing invariable resistors 7 and 8 and an adjustable resistor 9 for determining the temperature level of the heating element. The output voltage of the measuring bridge regulates the amplifier 5. A regulating loop for regulating the temperature of the measuring body is established thereby. As it is a question of a system provided with proportional regulation, a certain load error is going to arise in the loop which can be defined as the difference, dependent upon the load, between the desired value and the value of the regulated magnitude. As set forth in the foregoing, the load error, in conjunction with the thermal resistance of layer 2, serves to realize the desired total thermal resistance between the resistance wire 4 and the environment. The reduction of the loop amplification necessary for this purpose is produced in the embodiment shown by means of a resistor complex 10 which comprises an invariable resistor 11 and a variable resistor $P_4$. Tee load error which, in conjunction with the thermal resistance of layer 2, serves to fulfil that equation (IV) is valid for simulating the heat dissipated by a nude person. If it is a question of simulating the heat dissipated by a clothed person, it would be conceivable to achieve this by fitting to the outside of the measuring body a "stocking" or "sleeve" possessing the desired clo-value. It is simpler, however, to simulate the clothing by an increase of the load error in excess of the value required for simulating the heat dissipation from a nude person. The variable resistor $P_4$ is utilized to this end.

It will have to be remembered in this connection that when the clo-value for a person is increased, the effective area likewise is increased. Thus a clo-value of 1.0 corresponds to a surface area that is 1.15 as big as the surface area of the nude person. Consequently, the dry heat exchange $\Phi_{dry}$ is increased 1.15 times due to the larger surface. The surface area of the measuring body, however, is not changed and the clo-values of the measuring body will, therefore, have to be reduced 1.15 times per 1.0 clo for a person.

The modification of the loop amplification and, thereby, of the load error, may be effected in a way different from the one shown, for instance by direct regulation of the amplification in the amplifier 5.

As stated above, the degree of thermal discomfort at a given activity level and with a specific type of clothing is defined as the difference between, on the one hand, the internal heat production and, on the other hand, the heat loss to the actual environment for a person who is assumed to be in a state of thermal comfort. However, as the voltage $E_{eff}$ alone is representative of the resulting temperature $t_r$ of the environment, it has to be corrected in view of the set activity level and the set value of clothing so that it becomes possible to compare it as a voltage $E_1$ in a voltmeter 12, with a voltage $E_2$ which is representative of the internal heat production.

This is achieved in the apparatus shown in FIG. 2 by means of a first potentiometer which comprises a variable resistor $R_x$ adjusted with the aid of a switch $S_1$ as well as a resistor complex 13 which is composed of an invariable resistor 14 and a second potentiometer $P_1$. The voltage $E_1$ is derived from the arm of potentiometer $P_1$.

Voltage $E_2$ is produced by means of a resistor network which is connected to a voltage source having a constant voltage. The network is composed of a first resistor complex $R_z$ which consists of an invariable resistor 15 and a thid potentiometer $P_2$. Resistor complex $R_z$ has precisely the same value as resistor complex 13. Potentiometers $P_1$ and $P_2$, as well as the variable resistor $P_4$ are operated by means of a common operating means.

The network contains, in addition, a foruth potentiometer which comprises resistor $R_3$ which is adjustable by means of a switch $S_3$, as well as a fifth potentiometer $P_3$. Switches $S_1$, $S_2$ and $S_3$ are operated with the aid of a common operating means. Voltage $E_4$ to the resistor complex $R_z$ is derived from the arm of potentiometer $P_3$.

Since the relation between $t_r$ and, thereby, $E_{eff}$ and the PMV-value is linear, cf. FIG. 1, the voltage across the voltmeter has to meet the following requirements:

1. The voltage across voltmeter 12 has to change by such a value that the reading changes by one PMV-unit when $t_r$ changes by a value corresponding to a change in the PMV-value of 1.0 at the set values of activity level, clothing worn and water vapor pressure.
2. The difference in voltage between the terminals of the voltmeter has to be 0 volt when the measuring body is in equilibrium at the value of $t_r$ which corresponds to the same settings.

Requirement 1. is met by means of voltage $E_1$ and condition 2. is fulfilled thereafter by a suitable dimensioning of the network dealt with in the foregoing for producing voltage $E_2$. It appears from FIGS. 6 and 7 how the ratio $\Delta E_{eff}/\Delta PMV$ depends of the activity level and of the clothing, respectively.

$E_1$ has to vary by an amount corresponding to a change in the reading of the voltmeter of one PMV (—value) when the voltage of the measuring body changes $\Delta E_{eff}$. This is, so far as the activity level is concerned, achieved by means of the variable resistor $R_x$, for which, for each activity level set by means of a switch $S_1$, the following equation should hold:

$$\Delta E_1/\Delta E_{eff_{o\ clo}} = R_{13}/(R_{13} + Rhd\ x)$$

$\Delta E_1$ (for $\Delta PMV = 1$) is known when the sensitivity of the voltmeter 12 is known. $\Delta E_{eff_{o\ clo}}$ can be deduced from FIG. 6. $R_{13}$ is selected with a suitable value, for example, 1000 ohm. Subsequently, it is possible to find $R_x$ for each activity level.

The dependence upon the clothing worn can be regarded, with a good degree of approximation, to be linear in nature and it can therefore be obtained by means of the potentiometer $P_1$. However, it is also possible, of course, to achieve this by means of invariable resistors and switches.

The value of the potentiometer and the setting can be determined from the equation $$y = 1000(1 - \Delta E_{effective_{o\ olo}} / \Delta E_{effective_{y\ olo}}).$$

The resistors of the network are calculated on the basis of condition 2. quoted above. Under the given circumstances, $E_1$ has to be equal to $E_2$. Since the resistor complexes 13 and $R_x$ are identical, $E_3$ and $E_4$ will likewise have to be identical.

The value of potentiometer $P_3$ for the determination of the influence of the water vapor pressure is selected to a suitable value, 100 ohm, for example. The desired value of voltage $E_4$ is known for the potentiometer $P_3$ in the extreme positions 0 mbar and 25 mbar at any activity level. The following equations are available for determining the values of resistors $R_2$ and $R_3$:

$$R_a/(R_3 + R_{P_3}) = E_{4_{o\ mbar}}/(E_s - E_{4_{o\ mbar}}) \text{ where}$$
$$1/R_a = 1/R_2 + 1/R_x$$
$$R_b/R_3 = E_{4_{25\ mbar}}/(E_s - E_{4_{25\ mbar}}) \text{ where}$$
$$1/R_b = 1/(R_2 + R_{P_3}) + 1/R_x.$$

The invention is not limited to the embodiment shown in the drawing and described in the foregoing, but can be employed in many other embodiments that are obvious to a person skilled in the art and come within the scope of the appended claims.

It is thus possible to adjust potentiometer $P_3$ by means of a device for measuring the water vapor pressure of the air so that there is no call for having to manually adjust the water vapor pressure in the apparatus. Potentiometer $P_3$ may, furthermore, be dispensed with since the influence of the water vapor pressure is relatively slight.

Furthermore, the apparatus can be adapted in such a way that only one individual climatic factor, such as activity level or type of clothing, can be adjusted while the other is set to a permanent value.

The apparatus according to the invention may possibly be incorporated into a larger regulating system of one or several of the climatic factors, in that the difference between voltages $E_1$ and $E_2$ is utilized as a control magnitude.

An example of such a system is shown in FIG. 8, in which a chamber 16 is indicated with dotted lines and in which chamber a measuring body 17 is mounted, for example, of the type shown in FIG. 3, as well as a device 18 for measuring the humidity of the air. Measuring body 17 and device 18 are connected to an apparatus 19 according to the invention, for instance, of the type shown in FIG. 2. The output signal from apparatus 19 regulates the temperature of the air which, by means of a unit 20 and via a duct 21, is injected into chamber 16. By means of the system shown it is possible to achieve optimal climatic conditions inside the chamber when apparatus 19 is set to the clo-value and activity level of persons who are staying in the room.

The regulation of the temperature of the measuring body can be effected in a way different from the one shown. It is thus possible to allow the heating wire to consist of a material that possesses a suitable temperature coefficient and to utilize the resistance value of the heating wire proper as a measurement of the temperature.

Several measuring bodies may possibly be connected to the apparatus, e.g., with a view to a better mapping of the thermal conditions over a large area.

The shape of the measuring body may differ from the one illustrated. By way of example, it may be a double ellipsoid, that is to say, a body having an elliptical cross-section around two axes that are arranged perpendicular to each other.

What I claim is:

1. An apparatus for measuring thermal discomfort, comprising a measuring body for simulating the heat exchange of the human body with the environment, means for heating the measuring body, and regulating means for maintaining the temperature of the measuring body at a perdetermined value in the vicinity of the skin temperature of the human body, wherein the improvement comprises first means included in the regulating means for providing a load error, second means for providing an indication voltage indicative of the heating power supplied to the measuring body, third means for providing a first comparison magnitude proportional to the indication voltage, said third means including first means for setting a desired activity level corresponding to a fictitious total heat production in a human body and first means for varying the proportionality factor between the indication voltage and the first comparison magnitude in dependence on the set activity level, means for producing a second comparison magnitude depending on the set activity level and of such a value that the first and second comparison magnitudes are equal when the measuring body is under such thermal conditions as would be felt comfortable by a human body being at the same activity level as the one set by said desired activity level setting means, and means for comparing the first and second comparison magnitudes.

2. An apparatus as claimed in claim 1 wherein said third means includes fourth means for providing a setting corresponding to a desired type of clothing, said first means for providing includes second means for varying the load error in the regulating means, dependent on the set type of clothing, said third means includes third means for varying the proportionality factor between the indication voltage and the first comparison magnitude in dependence on the set type of clothing, and said means for producing includes fourth means for varying the second comparison magnitude in dependence on the set type of clothing.

3. An apparatus as claimed in claim 2 wherein the comparison means includes a pointer and a scale divided into units for indicating the degree of thermal discomfort, and wherein the third means for providing the first comparison magnitude includes a first stepwise adjustable resistor means adjusted by the setting of the activity level, the value of the first resistor means on each step being chosen in such a way that the reading on the scale is altered by one unit when the power supplied to the heating element changes by a value corresponding to the fact that the condition the measuring body happens to be in changes by one unit for the activity level the apparatus is set to.

4. An apparatus as claimed in claim 3 wherein the third means for providing the first comparison magnitude includes a second adjustable resistor means adjusted by the setting corresponding to a desired type of clothing, said second resistor means comprising said third means for varying, the value of the second resistor means being selected in such a way that the reading on the scale is changed by one unit when the power supplied to the heating element changes by a value corresponding to a change of clothing for which there is a change by one unit in the degree of comfort for the value of the activity level to which the apparatus has been set.

5. An apparatus as claimed in claim 1 wherein the means for producing the second comparison magnitude includes a voltage source having a fixed voltage.

6. An apparatus as claimed in claim 4 wherein the means for producing the second comparison magnitude includes a third adjustable resistor means comprising said fourth means for varying, and means for adjusting the second and third resistor means to the same value by the fourth means for providing a setting.

7. An apparatus as claimed in claim 6 wherein the means for producing the second comparison magnitude includes a fourth, stepwise adjustable resistor means adjusted by the setting of the activity level.

8. An apparatus as claimed in claim 7 wherein said means for producing the second comparison magnitude further comprises sixth means for providing a setting corresponding to a water vapor pressure, and fifth adjustable resistor means connected to said sixth means, said fifth reisstor means being adjusted by the setting of the water vapor pressure by the means therefore.

9. An apparatus as claimed in claim 1 wherein the measuring body has such a shape that the ratio between the projection areas in six principal directions is approximately the same as for a normal person.

10. An apparatus as claimed in claim 9 wherein the measuring body is in the shape of a double ellipsoid.

11. An apparatus as claimed in claim 9 wherein the measuring body is in the shape of two cones having a small apex angle and with the surfaces of their bases facing each other, the tops of the cones being truncated and having spherical segments.

12. An apparatus as claimed in claim 1 wherein the measuring body has internally a body of plastic foam, a resistance wire wound around the plastic foam and externally a thin layer of heat-insulating material.

13. A system for regulating the climatic conditions in a number of rooms by the apparatus claimed in claim 1, further comprising means in the comparison means for deriving a control voltage from the first and second comparison magnitudes, a unit for regulating at least one climatic factor of the rooms, and means for supplying the control voltage to the regulating unit.

14. A system for regulating the climatic conditions in a number of rooms by the apparatus claimed in claim 2, further comprising means in the comparison means for deriving a control voltage from the first and second comparison magnitudes, a unit for regulating at least one climatic factor of the rooms, and means for supplying the control voltage to the regulating unit.

* * * * *